US010991292B2

(12) United States Patent
Shin et al.

(10) Patent No.: US 10,991,292 B2
(45) Date of Patent: Apr. 27, 2021

(54) SYSTEM AND METHOD FOR PROTECTING SENSITIVE ON-SCREEN INFORMATION

(71) Applicant: THE REGENTS OF THE UNIVERSITY OF MICHIGAN, Ann Arbor, MI (US)

(72) Inventors: Kang G. Shin, Ann Arbor, MI (US); Chun-Yu Chen, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 0 days.

(21) Appl. No.: 16/741,110

(22) Filed: Jan. 13, 2020

(65) Prior Publication Data
US 2020/0226966 A1 Jul. 16, 2020

Related U.S. Application Data

(60) Provisional application No. 62/792,471, filed on Jan. 15, 2019.

(51) Int. Cl.
G09G 3/20 (2006.01)
G06F 21/84 (2013.01)
G06F 3/14 (2006.01)

(52) U.S. Cl.
CPC ......... G09G 3/2003 (2013.01); G06F 3/1407 (2013.01); G06F 21/84 (2013.01); G09G 2358/00 (2013.01)

(58) Field of Classification Search
CPC ............. G09G 3/2003; G09G 2358/00; G06F 3/1407; G06F 21/84; G06F 21/55; G06F 2221/032; G06T 11/60
See application file for complete search history.

(56) References Cited

U.S. PATENT DOCUMENTS

| 7,779,475 B2* | 8/2010 | Jakobson | ................. G09G 5/14 726/26 |
| 8,922,480 B1* | 12/2014 | Freed | ...................... G06F 21/60 345/156 |
| 10,025,938 B2 | 7/2018 | Krishnamurthi | |
| 2010/0259560 A1 | 10/2010 | Jakobson et al. | |

(Continued)

OTHER PUBLICATIONS

Tarasewich, Peter et al., "Protecting Private Data in Public", CHI 2006, Apr. 22-27, 2006.

(Continued)

*Primary Examiner* — Kent W Chang
*Assistant Examiner* — Sujit Shah
(74) *Attorney, Agent, or Firm* — Harness, Dickey & Pierce, P.L.C.

(57) ABSTRACT

People use their mobile devices anywhere and anytime to run various apps, and the information shown on their device screens can be seen by nearby unauthorized parties, referred to as shoulder surfers. To mitigate this privacy threat, techniques have been developed utilizing human vision and optical system properties to hide the users' on-screen information from the shoulder surfers. Specifically, the proposed techniques discretize the device screen into grid patterns to neutralize the low-frequency components so that the on-screen information will "blend into" the background when viewed from the outside of the designed visible range.

15 Claims, 8 Drawing Sheets

User sees             Shoulder surfer sees

(56) References Cited

U.S. PATENT DOCUMENTS

| | | | |
|---|---|---|---|
| 2014/0078164 A1* | 3/2014 | Chan | H04N 5/33 |
| | | | 345/589 |
| 2014/0201844 A1* | 7/2014 | Buck | G06F 21/554 |
| | | | 726/26 |
| 2015/0186673 A1* | 7/2015 | Stewart | G06T 11/60 |
| | | | 345/636 |
| 2017/0329399 A1* | 11/2017 | Azam | G06F 1/3265 |

OTHER PUBLICATIONS

Lian, Shiguo et al., "Smart Privacy-Preserving Screen Based on Multiple Sensor Fusion", IEEE Transactions on Consumer Electronics, vol. 59, No. 1, Feb. 2013.

Papadopoulos, Athanasios et al., "IllusionPIN: Shoulder-Surfing Resistant Authentication Using Hybrid Images", IEEE Transactions on Information Forensics and Security, vol. 12, No. 12, Dec. 2017.

Eiband, Malin et al., "My Scrawl Hides It All: Protecting Text Messages Against Shoulder Surfing With Handwritten Fonts", CHI 2016, May 7-12, 2016.

\* cited by examiner

View in close distance    View from far away

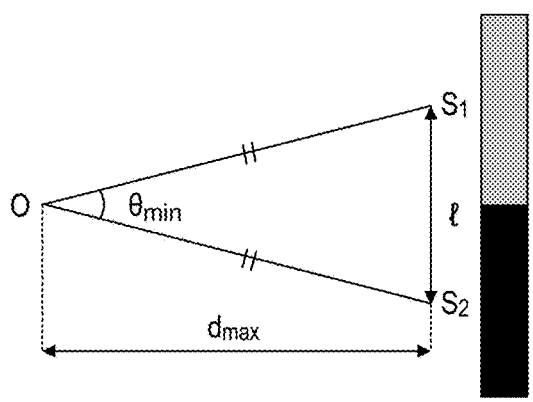
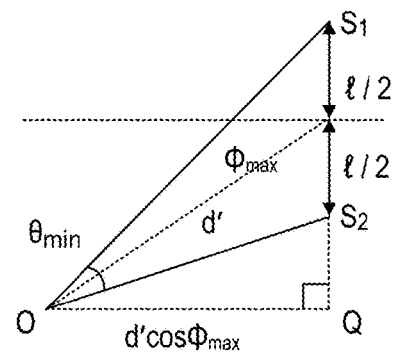
FIG. 5A  FIG. 5B
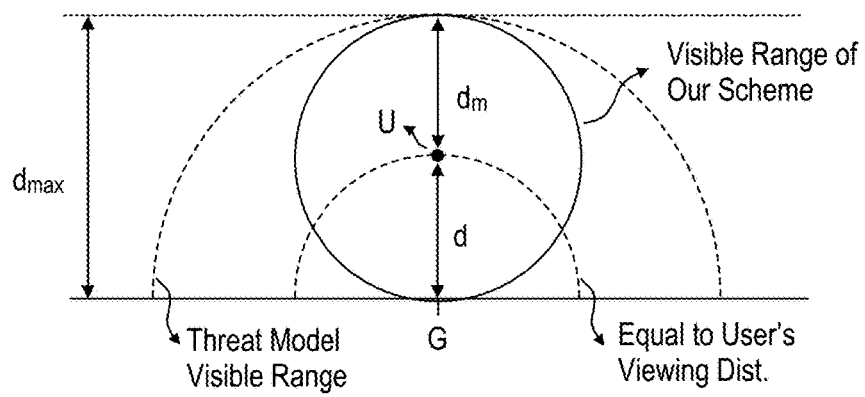
FIG. 6
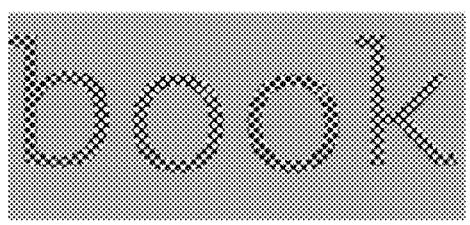  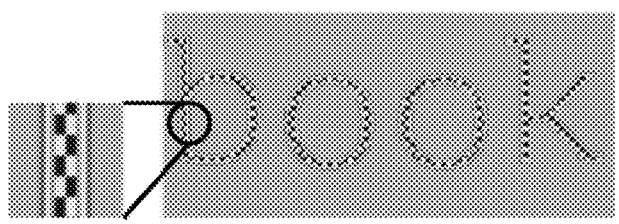
FIG. 7A  FIG. 7B

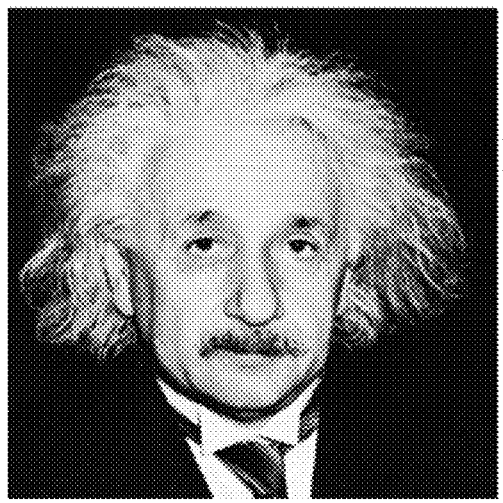
Original
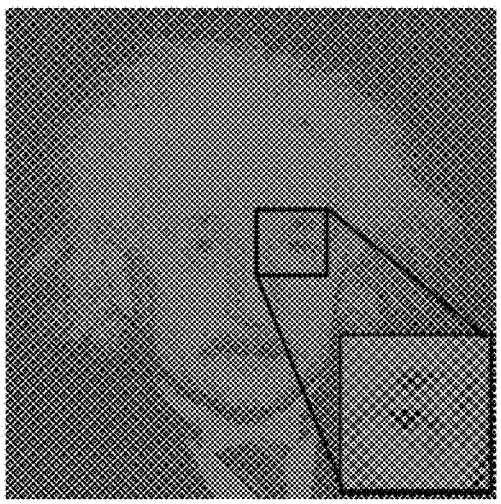
Protected
FIG. 11A
FIG. 11B
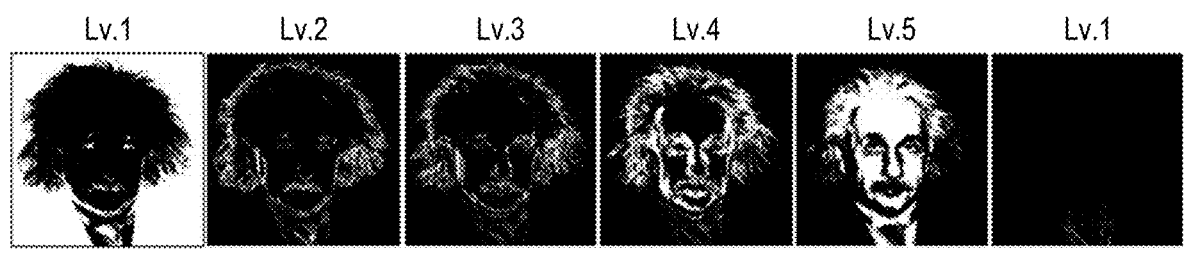
The pixels that are within each color level are marked as white.
FIG. 12A
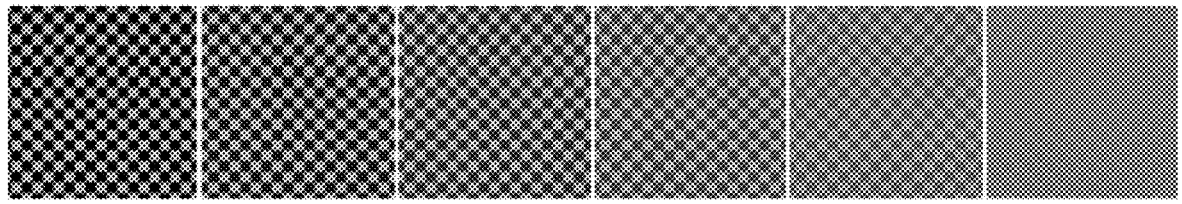
The pixels marked as white in each level are replaced by the corresponding grids.
FIG. 12B

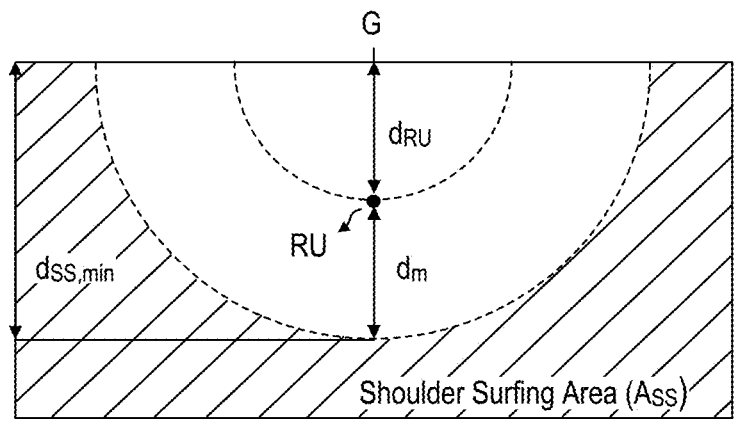
FIG. 15A
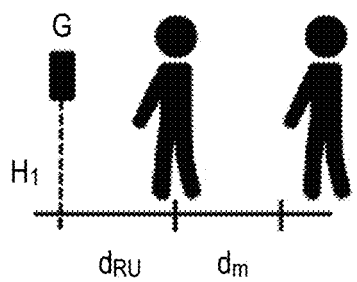 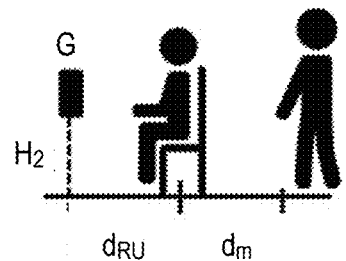
FIG. 15B     FIG. 15C
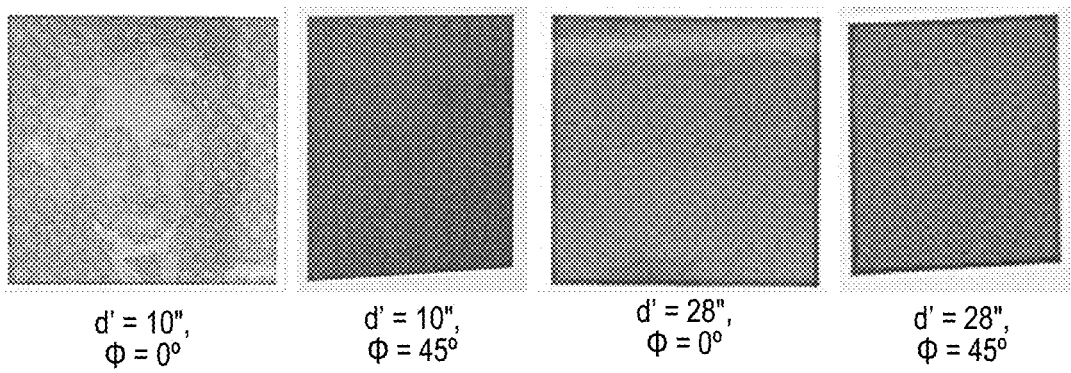
FIG. 16A   FIG. 16B   FIG. 16C   FIG. 16D

SYSTEM AND METHOD FOR PROTECTING SENSITIVE ON-SCREEN INFORMATION

CROSS-REFERENCE TO RELATED APPLICATIONS

This application claims the benefit of U.S. Provisional Application No. 62/792,471, filed on Jan. 15, 2019. The entire disclosure of the above application is incorporated herein by reference.

FIELD

The present disclosure relates to system and methods for protecting sensitive on-screen information.

BACKGROUND

People use mobile devices everywhere they go, even in public areas. The information shown on their device screens could be personal or sensitive (e.g., bank account information and text messages to/from personal friends), and hence the users would not want others to see it. However, people nearby can easily see the information displayed on the device screen by peeking at (or shoulder surfing) the screen.

Although users will take proper defensive actions when they are aware of someone else peeking at their device screens, they are reported to be aware of only 7% of shoulder surfing incidents. Moreover, shoulder surfers are reported to succeed in obtaining a 6-digit PIN with a 10.8% probability by taking just one peek. Users may try not to view sensitive/private information in public areas, but cannot always help it. For example, the Justice Secretary of Philippines, Vitaliano Aguirre II, was enraged at the leakage of his text messages by someone who had peeked at, and taken a picture of, his smartphone screen during a Senate hearing.

The most popular defense against shoulder surfing is to attach a privacy film on the device screen, which limits the visible range of screen to a certain viewing angle to hide the on-screen information. Even though it is an effective way to protect on-screen information when the shoulder surfer is outside of the visible range, the privacy film provides little protection inside the visible range, e.g., the shoulder surfer is right behind the user. Also, it requires users to beware of the privacy risks and take appropriate actions before viewing any sensitive on-screen information. This requires users to buy and attach a privacy film, or buy devices equipped with privacy films (e.g., HP Sure View), incurring additional cost and/or effort.

Researchers and IT companies have been seeking software solutions that can proactively protect users' on-screen information from the end of information provider (e.g., Google's shoulder surfer detection), or let users hide their on-screen information without requiring other hardware protection (e.g., BlackBerry's Privacy Shade). They usually focus on the protection of (i) authentication secrets, which can be used to "unlock" devices and provide access to their contents, and (ii) other general information, including the on-screen texts and images displayed by applications. The former only focuses on the protection of authentication secrets, while the latter usually blocks the information altogether, which also prevents the intended user from viewing the on-screen information.

Considering the possible leakage of sensitive on-screen information and the lack of their effective protection, this disclosure enables information senders/providers to proactively protect sensitive on-screen information instead of passively relying on the awareness and presence of protection at the receivers, such as use of a privacy film. This goal is met by developing a novel solution, called HideScreen, for sensitive on-screen information protection without requiring any additional hardware. HideScreen can protect the sensitive on-screen information without compromising users' intended tasks/apps, and is simple enough to implement and run on commodity mobile devices while consuming as little resources (e.g., computing power and energy) as possible to support good user experience.

HideScreen is tailored to meet the need of apps that display some short but sensitive information—such as PIN, account/password, and partially-personal messages—and protect the on-screen information from unauthorized parties located outside of the designed viewing range. Specifically, HideScreen focuses on the protection of short texts on the screen which can also protect the texts shown on soft keypad/keyboard, as shown in FIG. 1. When key shuffling is used, HideScreen will prevent a shoulder surfer from acquiring sensitive information by observing the on-screen locations the user touches. Other than on-screen texts, some images, such as personal photos or the security picture used for bank account login, can also be privacy/security-sensitive, and hence HideScreen's protection is extended to on-screen images.

This section provides background information related to the present disclosure which is not necessarily prior art.

SUMMARY

This section provides a general summary of the disclosure, and is not a comprehensive disclosure of its full scope or all of its features.

A method is presented for displaying text on a display device. The method includes: receiving an anticipated viewing distance between the display device and a user; calculating length of a cell in a grid as a function of the anticipated viewing distance, where the length of the cell is larger than size of a pixel of the display device; receiving text for display on the display device, where the text is comprised of one or more alphanumeric characters; and displaying the text on the display device, such that each alphanumeric character in the text is rendered using a grid, where the grid has a checkered pattern and the cells in the grid have the calculated length.

In another aspect, a method is presented for displaying an image on a display device. The method includes: receiving a grayscale image or a grayscale image converted from a colored image; partitioning the grayscale image into two or more color layers, where each of the two or more color layers corresponds to a range of intensity values for the pixels in the grayscale image and the ranges of intensity values for the two or more color layers are mutually exclusive from each other; for each color layer of the two or more color layers, replacing pixels with intensity values in the corresponding range with a grid, such that the grid has a checkered pattern by cells having a darker color and cells having a lighter color; adding each of the color layers of the two or more color layers together to form a composite protected image; and displaying the composite protected image on the display device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A is a diagram showing the relationship between the minimum resolvable angle and the visible distance.

FIG. 5B is a diagram showing the relationship between the minimum resolvable angle and the visible angle.

FIG. 6 is a diagram showing the visible range of a user.

FIGS. 7A and 7B are examples of displaying a word using a protection grid without and with a boundary, respectively.

FIGS. 11A and 11B are example images from before and after the method in FIG. 10 was applied, respectively.

FIG. 12A shows the example image partitioned into six different color layers.

FIG. 12B shows contrasting grid patterns for use in each of the six different color layers.

FIGS. 15A-15C are diagrams showing three basic evaluation setting.

FIGS. 16A-16D show example of protected images.

Corresponding reference numerals indicate corresponding parts throughout the several views of the drawings.

DETAILED DESCRIPTION

Example embodiments will now be described more fully with reference to the accompanying drawings.

The goal of adversaries (shoulder surfers) is to acquire the information shown on the user's device screen. The information that shoulder surfers are interested in would be texts and static images associated with applications, such as messaging/texting and account login. Since the reported/known shoulder surfing events are mostly casual and opportunistic, it is assumed the most common case in which shoulder surfers (SSs) use their eyes or smartphone cameras to acquire/comprehend the on-screen information.

Figure 1:
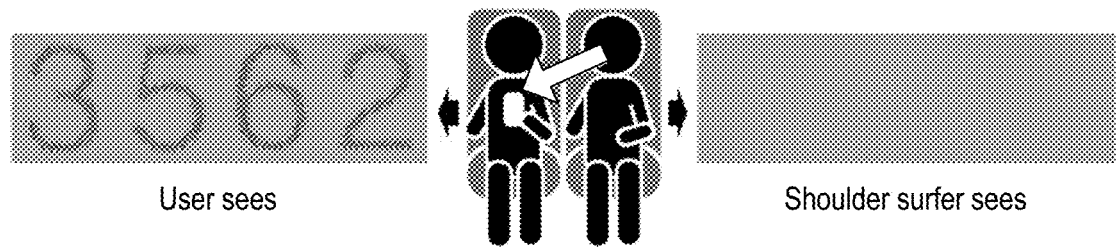
FIG. 1 is a diagram illustrating the effect of the proposed solution in a common shoulder surfing scenario.
Figure 2A:
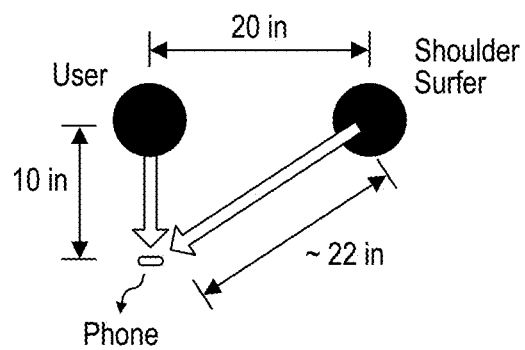
FIGS. 2A and 2B are diagrams depicting a threat model from a top view and a side view, respectively.

Smartphones/tablets/laptops are assumed to be viewed by their users from a distance up to 24" (equal to the length of human arms). If and when the shoulder surfer tries to acquire on-screen information with his own eyes, the difference between the user's and the shoulder surfer's viewing distance is assumed to be greater than 12" because a shoulder surfer would not want to be caught by the device user that he is peeking at the screen. As shown in FIG. 2A, this is also the difference between the user's and the shoulder surfer's viewing distance when the shoulder surfer is sitting right next to the user while the distance between the user and the shoulder surfer is 20" (i.e., the average shoulder width) and the viewing distance of the user is 10" (i.e., average smartphone viewing distance).

Figure 2B:
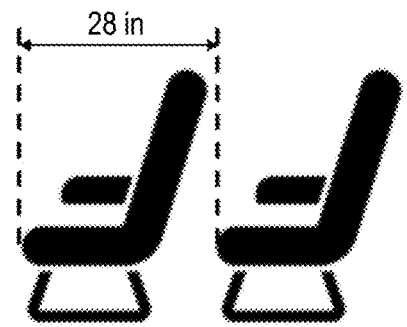

It is assumed that the shoulder surfer may also try to acquire the user's on-screen information by using his smartphone camera, for example, when he is sitting in a seat behind the user. In such a case, the distance between the device and the shoulder surfer will be the size of the seat pitch (FIG. 2B). Since the seat pitch ($\geq 28$") on an airplane tends to be smaller than other transportation vehicles, the setting of our threat model is used, erring on the conservative side.

As mentioned before, it is also assumed casual and opportunistic shoulder surfers, but not malicious professionals with special equipment, such as binoculars and digital cameras, who target a specific individual for specific information. This excludes the case in which the shoulder surfers use a camera to video-record the user's device screen and then process the video to extract the sensitive information. This exclusion should not diminish the value of HideScreen, since users are unlikely to view their confidential information in public areas and the attackers have other ways to obtain the target information than shoulder surfing, such as implanting/installing malware in the targeted user's device.

By way of background, an optical system is capable of producing or perceiving light. Here, focus is on optical systems that perceive light. The resolving power of an optical system is defined as its ability to distinguish two adjacent light sources. It is usually represented by the minimum angle with which the system can distinguish two separate light sources as individual ones (i.e., minimum resolvable angle).

Figures 3A, 3B, 3C:
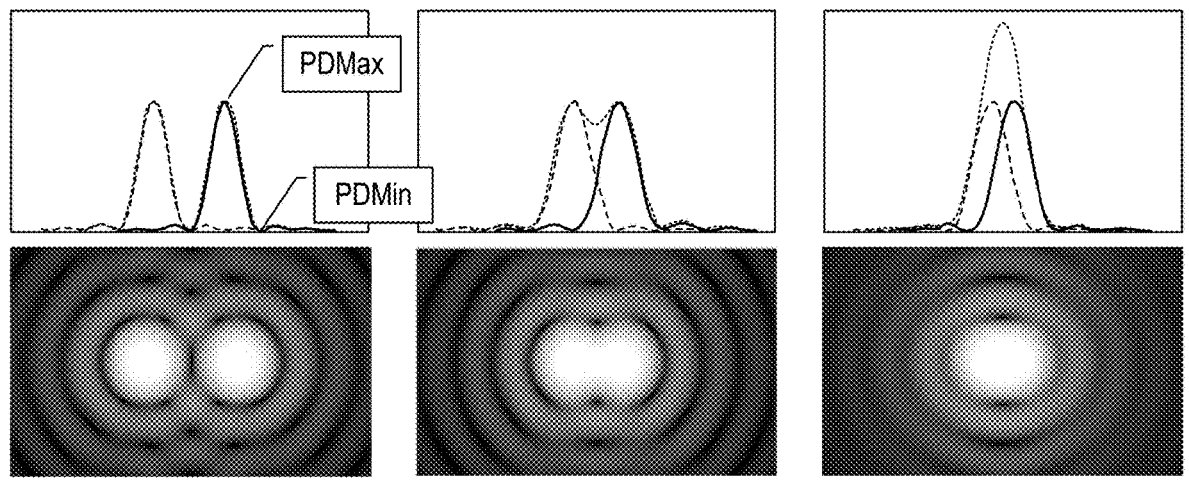
FIGS. 3A-3C are graphs and corresponding images showing the conditions for two light sources to be resolvable, just resolvable and unresolvable, respectively.

The limit of the resolving power of an optical system is determined by the diffraction of light. According to Rayleigh Criterion, an optical system with an aperture can resolve two separate point light sources if the first principal diffraction minimum (PDMin) of one light source coincides with the principal diffraction maximum (PDMax). FIGS. 3A-3C show the conditions for two light sources to be resolvable, just resolvable (i.e., Rayleigh Criterion), and unresolvable, respectively. This minimum angle separation is then given by $$\theta_{min} = 1.22 \lambda/D, \quad (1)$$

where $\lambda$ is the wavelength of light, and D is the aperture diameter of the optical system. As shown in Eq. (1), the resolving power of an optical system is determined by its aperture. That is, the larger the aperture, the greater the resolving power.

Human vision is nothing but an optical system and hence is subject to Rayleigh Criterion. However, humans' perception of images/patterns has some special characteristics. Human vision is shown to have the highest sensitivity when the spatial frequency is around 8 cycles per degree (c/d) and the perception of patterns is cut off around 60 c/d (i.e., a person cannot recognize that there is a pattern).

While the information embedded in the texts is their meaning, the information embedded in the images is their spatial pattern. To deal with their unique characteristics, this disclosure introduces different schemes for different protection targets. The Hide-Text method, the HideImage method, and the SelImage method are the three protection schemes employed in HideScreen. These three schemes are compared and summarized in Table 1 below.

TABLE 1

Comparison of protection schemes in HideScreen

| | HideText | HideImage | SelImage |
|---|---|---|---|
| Protection Target | Text | Image | Image |
| Protection by Viewing Distance | ✓ | ✓ | ✓ |
| Protection by Viewing Angle | ✓ | ✓ | ✓ |
| Protection by User Interaction | x | x | ✓ |
| Plain Text/Image Protection | ✓ | ✓ | x |
| Lossless Protection | ✓ | x | ✓ |

The HideText method focuses on the protection of texts, and the other two protect images. All of these are designed to protect information by viewing distance and angle, meaning that a shoulder surfer will not be able to read the information correctly from the outside of the designed viewing range.

The two image protection schemes differ in loss or no loss of information. The HideImage method protects the images at the cost of some content loss (i.e., not showing the original image on the screen), while the SelImage method protects the images without loss of content, thus allowing a shoulder surfer to be able to identify the real information with some probability.

Figures 4A, 4B:
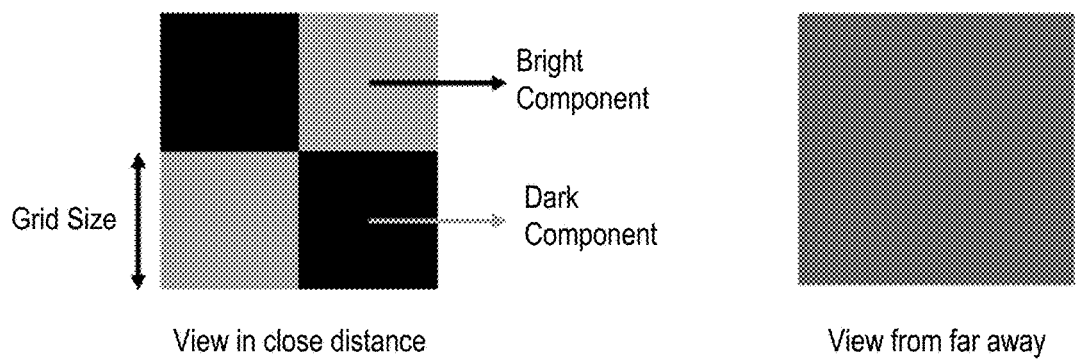
FIGS. 4A and 4B depict viewing a grid at a close distance and far away, respectively.

FIGS. 4A and 4B illustrate the basic concept. If a user views a grid pattern within the designed range, he will see the grid as seen in FIG. 4A; otherwise, he will only see an area of single color as seen in FIG. 4B. HideScreen captures the information to be shown on the screen and transforms it to a grid image, which is an image composed of grids.

Before discussing the details of a grid image, the properties of a grid are first introduced. There are three main characteristics of a grid. The first is grid size, l, which is defined as the size of a single color square. Since one can approximate a single-colored square as a single point light source, the grid size determines the range that users can view the information (denoted as visible range). The larger the grid size, the longer the visible range.

The grid is formed by a checkered pattern of cells having a darker color and cells having a lighter color. The second and third characteristics are the colors of dark ($H_{dark}$) components and the lighter/bright ($H_{bright}$) components in the grid, respectively. In one embodiment, each color H can be represented as (r, g and b), where r, g and b are the values of red, green and blue components, respectively. It can also be represented by a single integer (#000000-# FFFFFF) when 24-bit color coding is used. These two characteristics determine the color a user will perceive when viewing the grid. In the example embodiment, use $H \approx H_1 \oplus H_2$ to mean that a grid with ($H_1$, $H_2$) components looks the same as a single color H when it is viewed from far away. Note that the colors may look slightly different on different screens even if they are displaying a color with the same color value. So, to use HideScreen, the displayed colors must be calibrated a priori once for each device as will be described below.

Let one consider how to calculate the visible distance and angle for a given grid pattern with grid size $\ell$. Suppose one is using an optical system, such as a camera, to view the grid pattern, and its aperture/lens size is D. The maximum resolution is determined by the minimum resolvable angle (Eq. (1)).

FIG. 5A shows the relationship between the minimum resolvable angle ($\theta_{min}$) and the visible distance ($d_{max}$). After obtaining $\theta_{min}$, one can calculate the visible distance as:

$$d_{max} = \frac{\ell}{2\tan\left(\frac{1}{2}\theta_{min}\right)} = \frac{\ell}{2\tan\left(0.66\frac{\lambda}{D}\right)}. \quad (2)$$

Now, let's consider the case when a user is viewing the grid from distance d'<$d_{max}$ as shown in FIG. 5B. If the user keeps moving away from the perpendicular line, the maximum visible angle $\phi_{max}$ will occur when the viewing angle between $S_1$ and $S_2$ is $\theta_{min}$. One can obtain $\phi_{max}$ by solving Eq. (3)=Eq. 5:

$$\text{area}(\Delta OS_1S_2) = \frac{1}{2} \times |\overline{S_1S_2}| \times |\overline{OQ}| = \frac{1}{2}\ell d'\cos\phi_{max} \quad (3)$$

$$= \frac{1}{2}\sin(\angle S_1OS_2) \times |\overline{OS_1}| \times |\overline{OS_2}| \quad (4)$$

$$= \frac{1}{2}\sin\theta_{min} \times \sqrt{(d'\cos\phi_{max})^2 + \left(d'\sin\phi_{max} + \frac{\ell}{2}\right)^2} \times \sqrt{(d'\cos\phi_{max})^2 + \left(d'\sin\phi_{max} - \frac{\ell}{2}\right)^2}. \quad (5)$$

If d'$\gg\ell$ and $\phi_{max}$ is not close to 0, $\phi_{max} \approx \cos^{-1}(d'\theta_{min}/\ell)$.

As mentioned above, human vision has the perception cutoff at around 60 c/d. Therefore, the minimum resolvable angle for human vision is $$\theta_{H,min} \approx 1/60° \approx 3\times 10^{-4}(\text{rad}). \quad (6)$$

Note that the equations above can also be applied to human vision if one replaces $\theta_{min}$ with $\theta_{H,min}$. The reason for this substitution is that the result obtained above depends only on the resolving power, i.e., the limit of spatial frequency that certain optical systems can resolve. The visible distance for human vision is then given as $$d_{H,max} = \frac{\ell}{2\tan\left(\frac{1}{2}\theta_{H,min}\right)} \approx 3333\ell. \quad (7)$$

However, it is understood that Eq. (2) can be applied to any optical systems as long as their resolving power is known.

Once the grid size $\ell$ is set, the visible distance of the grid is determined by:

$$d' \approx \frac{\ell\cos\phi}{\theta_{min}}, \quad (8)$$

where $\phi$ is the viewing angle, $\theta_{min}$ is the minimum resolvable angle, and d' is the corresponding visible distance. It shows that the visible distance is proportional to the cosine of viewing angle for a given grid size. Hence, the visible range is a circular area with the diameter equal to $d_{max}$ as seen in FIG. 6. In the example embodiment, $$d_{max} = d_{H,max} = d + d_m, \text{ where } d_m = 12''. \quad (9)$$

The rationale behind this design, instead of setting $d_{max}=d$, is to leave the margin ($d_m$) for errors in the measurement of viewing distance, errors of grid quantization, and individual vision differences. This design also ensures that the protected information has better readability, since human vision generally has better sensitivity at lower spatial frequencies. In one example, $d_m=12"$ is chosen as it is the minimum difference of viewing distances between the user and the shoulder surfer defined in the threat model. Other values are contemplated for the visible distance with the scope of this disclosure.

This disclosure proposes using grids for hiding on-screen information because if a person views the grid from outside of the visible range, he cannot resolve the bright and dark components into two individual sources. Therefore, he will only see the "mixture" of the two light sources. By utilizing this property, one can use the grid to create a pattern P for a designated visible distance $d_{max}$. What remains is to find a background B that has the same color as the pattern P when viewed from the outside of the visible range. One can then create a grid image G=P+B, so that only the person within the visible distance can see the pattern correctly. FIGS. 7A and 7B show an example of applying the protection by grids to a text, where the word "book" is the P component that is replaced by grids and the gray background is the B component.

Figure 8:
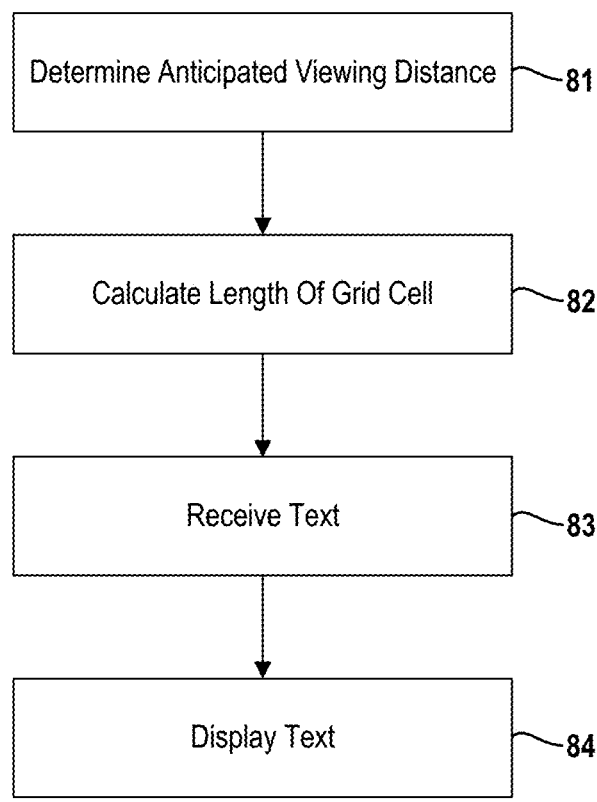
FIG. 8 is a flowchart illustrating a method for displaying text using a protection grid.

Based on this approach, the HideText method for displaying text on a display device is described in relation to FIG. 8. As a starting point, a visible range of the user is determined as indicated at 81. In one embodiment, the visible range is set to an anticipated viewing distance between the user and the display device. The value for the visible range may be a default value or a value calibrated by the user. In another embodiment, the visible range accounts for a margin for error. That is, the visible range is set to sum of the anticipated viewing distance and the margin for error ($d_{max}=d+d_m$). As noted above, the margin for error is preferably set at the viewing distance between the user and the shoulder surfer.

The length of a cell in a grid is then calculated at 82 as a function of the visible range of the user. More specifically, the length of the grid cell $\ell$ is calculated as a function of the anticipated viewing distance and the margin for error as follows:

$$\ell = (d+12")/3333. \quad (10)$$

where d is the anticipated viewing distance and the margin for error is set at twelve inches.

Since the grids are composed of pixels, the actual grid size, $\ell\,*$, can also be determined as a function of pixel size of the display device. For example, the actual grid size can be computed by:

$$\ell\,* = \text{round}[\ell/\ell_p] \times \ell_p. \quad (11)$$

where $\ell_p$ is pixel size of the display device.

Grid size can be determined in advance or dynamically upon receipt of the text to be displayed. Upon receiving the text, the text is displayed on the display device at 84, such that each alphanumeric character in the text is rendered using a grid, the grid has a checkered pattern and the cells in the grid have the calculated length or grid size. It is to be understood that only the relevant steps of the methodology are discussed in relation to FIG. 8, but that other software-implemented instructions may be needed to control and manage the overall operation of the system.

To enhance the readability of the protected texts without weakening the protection against shoulder surfers, the alphanumeric characters comprising the text may be rendered with a boundary separating each character from the background. However, directly adding boundaries to the grid-based text will compromise protection, because adding boundaries is equivalent to adding a constant low-frequency component to the original grid-based texts, and hence a shoulder surfer can see this low-frequency component from far away. To solve this problem, one needs to add not only the boundaries to the grid-based texts, but also its complementary components to neutralize the effect of low-frequency component. FIG. 7B shows an example of grid-based texts with boundary enhancements.

Figure 9:
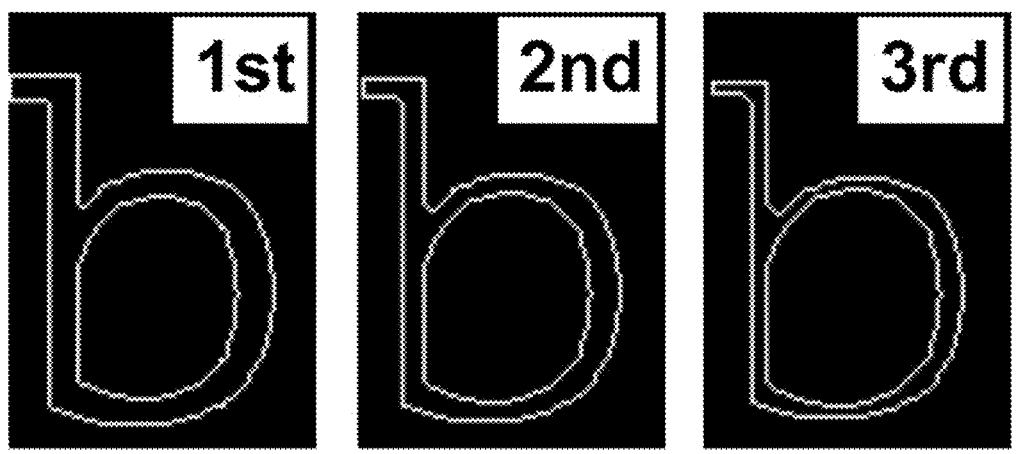
FIG. 9 is a diagram depicting the boundary layers of the character b.

Steps for displaying text with one or more boundaries are further described below. The first step of generating a protected text is to identify the text boundaries. Since text can be viewed as a binary image when displayed on the screen, the pixels that have direct contact with the background are considered as boundary pixels. HideText divides the text recursively by identifying the pixels that are next to the inner part of the previous boundary as shown in FIG. 9. This set of boundaries is referred to as "boundary layers".

After obtaining the boundary layers, one can use grids to display the texts as shown in FIG. 7A. To create the highest contrast, $H_{dark}$ and $H_{bright}$ should be set to black (#000000) and white (#FFFFFF), respectively. In the example embodiment, the alphanumeric characters in the text are rendered with a series of three boundaries. The next step is to replace the first three boundary layers with curves of different colors. The rule of thumb is to replace the first and second boundary layers with darker and brighter colors, respectively, than the background color ($H_{BG}$), where the difference in color between the boundary layers and $H_{BG}$ should decrease as L increases. In this example, the colors for the first three boundary layers are chosen by:

$$H_L = \text{round}\left[H_{BG} + \frac{(3-L)(-1)^L}{10}H_{bright}\right]. \quad (12)$$

where L=1,2,3 are the indices of boundary layers. In this way, HideText is able to compensate the low frequency components of each replaced layer. The boundary layers are used because they will increase low-frequency components and enhance the readability. However, adding more boundary layers will also make it easier to see the information from far distances. According to preliminary experimental results, replacing three boundary layers can enhance readability without injecting too much low-frequency components.

The last step is to fill in the background with a certain color $H_{BG}$, so the protected text will blend into the background ($H_{BG} \approx H_{bright} \oplus H_{dark}$) when viewed from the outside of the visible distance. How to calibrate color to find the background $H_{BG}$ will be discussed below.

The protected text generated by the HideText method can be considered as a special type of font, which hides the text from shoulder surfers. The HideText method can be implemented so as to store the previous computation results (as font files) and reuse them later. Since the grid patterns are composed of pixels, the grid size can only be certain discrete values. Depending on the user's regular viewing distance and the size of an individual pixel, the grid size is usually composed of 3-5 pixels and therefore won't take up much storage space.

Since the HideText method protects information based on the average of adjacent pixels, it provides better protection if the original information has more lower frequency components. That is, the HideText method will provide better protection if the original texts are in bolder fonts than in thinner fonts.

The HideText method can also be applied to colored texts by changing the color of bright components. For example, if the desired text color is red, the bright components $H_{bright,R}$ can be set to (255,0,0) and one can use this colored grid with background $H_{BG} \approx H_{bright} \oplus H_{dark}$ to display texts with colors.

Figure 10:
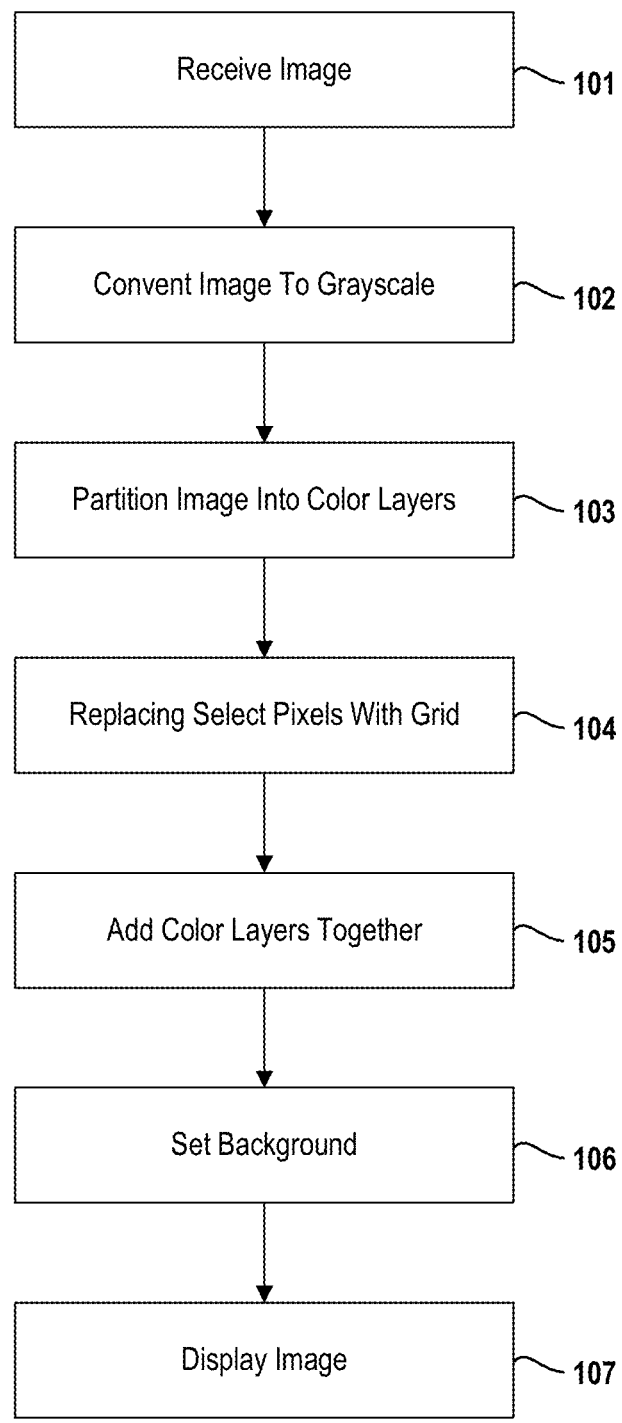
FIG. 10 is a flowchart illustrating a method for display an image using grids.

In another aspect of this disclosure, the HideImage method is shown in FIG. 10. While the HideText method displays the full text without information loss, the protection of images is achieved with some loss of information. The goal of the HideImage method is thus to provide a coarse-grained but comprehensible image to the user when he views the protected image. Like the HideText method, the Hide-Image method utilizes the fact that a grid will look like a single-colored background when viewing from the outside of the designed range. Moreover, it utilizes different grids of the same "average" color ($H_{avg}$) to represent a different brightness scale.

FIG. 11A depicts an example image to be displayed on a display device. With reference to FIG. 10, an input image is received at 101 by a computer processor. For color images, the images are first converted to grayscale as indicated at 102.

The grayscale image is then partitioned at 103 into two or more different color layers. Each of the two or more color layers corresponds to a range of intensity values for the pixels in the grayscale image, such that the ranges of intensity values for the color layers are mutually exclusive from each other. For illustration purposes, the grayscale image may be partitioned into six color layers as shown in FIG. 12A, where the range of intensity values for layer 1 is 0-40, the range of intensity values for layer 2 is 41-80, and so forth up to 255. Although not limited thereto, the ranges of intensity values are preferably partitioned evenly. More or less than six color layers are also contemplated by this disclosure.

For each color layer, select pixels are replaced with a grid, such that the grid has a checkered pattern with cells having a darker color and cells having a lighter color. More specifically, pixels with intensity values in the corresponding range associated with a given color layer are replaced with a grid; whereas, pixels with intensity values outside the corresponding range associated with the given color layer are set to black. Continuing with the example above, in color layer 1, pixels having intensity values in the range of 0-40 are replaced with a grid and pixels having intensity values greater than 41 are set to black. Similarly, in color layer 2, pixels having intensity values in the range of 41-80 are replaced with a grid and pixels having intensity values outside the range of 41-80 are set to black.

Contrast between the darker color and the lighter color of the grid varies amongst the six color layers as seen in FIG. 12B. In an example embodiment, the bright-dark component combinations for the color layers are determined as follows. First, identify the "average" color $H_{avg}$=round[{$H_{white}$+$H_{black}$)/2]. Second, the color of dark component for layer i is identified by:

$$H_{dark,i} = \text{round}\left[\frac{(H_{avg} - H_{black})}{N_{level}} \times i + H_{black}\right]. \quad (13)$$

Finally, identify $H_{bright,i}$ such that $H_{avg} \approx H_{bright,i} \oplus H_{dark,i}$ using the color calibration process discussed below.

Returning to FIG. 10, each of the color layers are added together at 105 to form a composite protected image and the composite protected image is displayed at 107 against a background on the display device. FIG. 11B depicts the composite protected image. In this example, the color of the background is set to an average of the darker color and the lighter color of the grid. It is to be understood that only the relevant steps of the methodology are discussed in relation to FIG. 10, but that other software-implemented instructions may be needed to control and manage the overall operation of the system.

Figure 13:
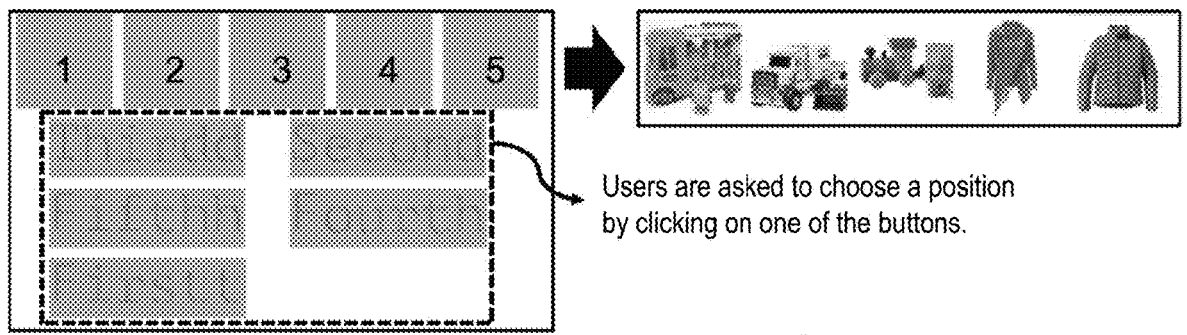
FIG. 13 illustrates the SelImage method.

Since the HideImage method will cause some visual information loss, an alternative image protection scheme is presented, called the SelImage method, which doesn't incur any information loss. This protection utilizes the concept of k-anonymity to hide an image. That is, the real image is displayed along with k-1 other decoy images on the screen. FIG. 13 shows an example of the SelImage method. Before showing an image on the screen, the system will display blank image icons and ask the user to choose where to display the image. Of course, all the texts shown on the screen are protected by the HideText method and the order of choice options is randomized.

Android smartphones and a tablet (Nexus 5X, Nexus 6P, Pixel XL and Nvidia Shield K1) are used for the prototype of HideScreen. Six apps have been implemented for the purpose of (i) color calibration, (ii) text protection evaluation, and (iii) image protection evaluation, respectively. Given below are the implementation details of these apps.

Since visual characteristics are used to hide the on-screen information, HideScreen first calibrates the color of the screen and creates a color profile. This is a one-time effort for each device. After the calibration, HideScreen-supported applications will be able to load the information (i.e., texts or images) and generate protected texts/images to be displayed on the screen according to the estimation user's viewing distance and the color profile.

Figure 14:
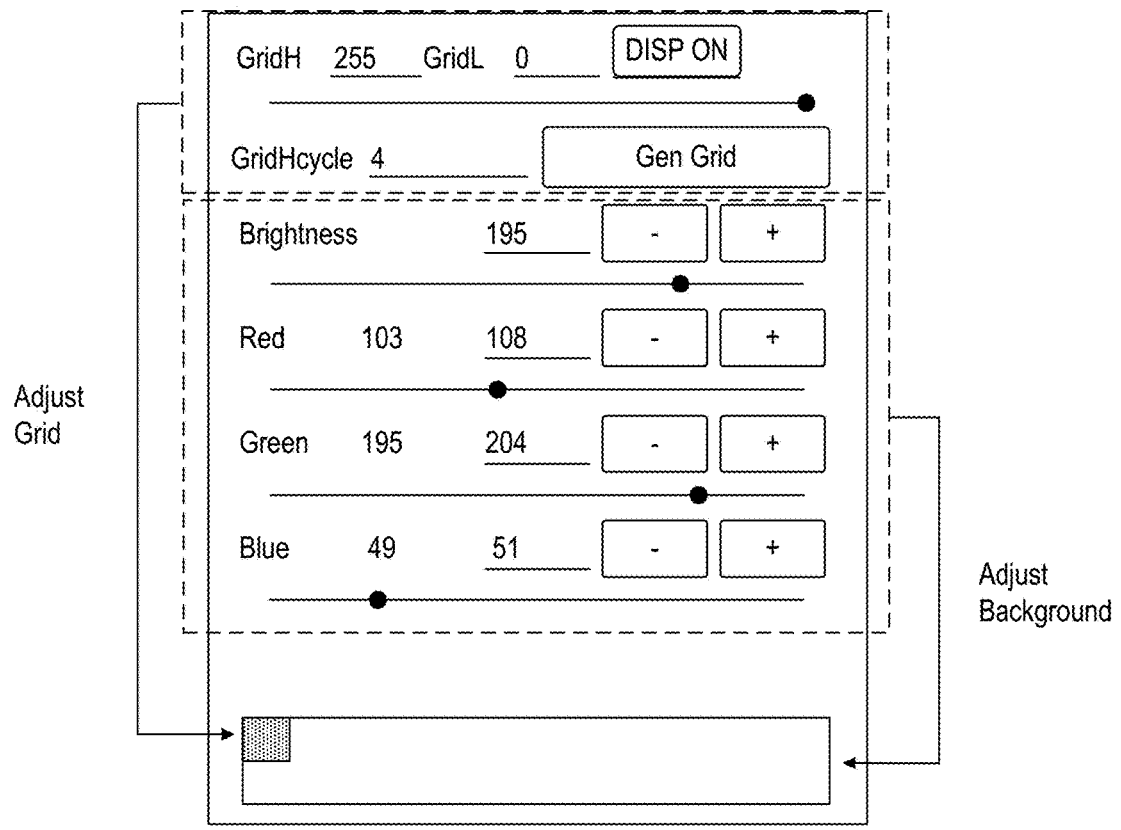
FIG. 14 is an example user interface for implementing color calibration.

FIG. 14 shows an example user interface used during development of HideScreen. The main goals of color calibration are to identify (i) $H_{BG}$ for grids with different grid sizes, and (ii) $H_{bright,i}$ for different color layers in the HideImage method.

First, a target grid is shown on the screen and the user should move the smartphone until he cannot see the details of the grid. The user can then adjust the background color by moving the seek bars. The next step is to adjust the brightness of background to match the target grid. The user may repeat the adjustments until he cannot distinguish the grid from the background (i.e., $H_{BG} \approx H_{bright,i} \oplus H_{dark}$). This process should be repeated for each grid size.

For the HideImage method, the background color will first be set to $H_{avg}$ (this is opposite to the process of identifying $H_{BG}$). The user should then adjust the seek bar of $H_{bright,i}$ until $H_{avg} \approx H_{bright,i} \oplus H_{dark,i}$ for a given $H_{dark,i}$. This process should be repeated for each combination of color levels and grid sizes.

During the development of HideScreen, participants were recruited to assess the calibration time using the interface shown in FIG. 14. The average calibration time per calibration is 16.0 s. For a smartphone, it usually requires 3 grid sizes and 6 color levels to provide proper protection, i.e., a total of 3×(1+6)=21 cases. That is, users will be able to finish the entire calibration process within 6 minutes.

FIGS. 15A-15C shows the basic evaluation settings. Twenty volunteers of ages 18-40 were recruited on campus for the evaluation of HideScreen. There are at least 10 participants in each test. Before the evaluation starts, devices were placed on a table or a stand (position G in FIG. 15A). Participants first act as the real user (RU) and view the content shown on the screen from certain distances ($d_{R_u}$) right in front of the device. The information displayed on the screen is adjusted based on the estimation of the viewing distance. After acting as a real user, the participants act as a shoulder surfer and try to read/acquire the information shown on the screen. While acting as a shoulder surfer, the participants are free to move their position as long as they are in the shoulder surfing area ($A_{SS}$), where as $A_{SS}$ is defined to be the area in which the viewing distance ($d_{SS}$) is greater than $d_{SS}$, min=$d_{RU}$+$d_m$. In each case, shoulder surfers are asked to identify the information shown on the screen when it is viewed (a) from the outside of the designed visible range and (b) with special equipment. The participants were asked to try their best to identify as many targets as possible while acting as both a real user and a shoulder surfer. Note that the participants did not know their roles in the experiment, since we did not tell them which roles they were to play and they were only asked to view the on-screen information within a certain range.

When testing with a smartphone, the participants were standing with the device placed on a phone stand ($H_1$=50-55") according to participants' heights as seen in FIG. 15B. When testing with a tablet or a laptop, the device was placed on the desk ($H_2$=30") and the participants were sitting while acting as a user, and standing while acting as a shoulder surfer as seen in FIG. 15C.

Shoulder surfer recognition rate (SSRR) and user recognition rate (URR) are used as the metrics for the evaluation of HideScreen's effectiveness. SSRR is defined as the probability that the surfer successfully reads the information on the screen:

$$SSRR = N_{SS,Success}/N_{Total} = 1 - R_{Protection}$$

where $R_{Protection}$ is the information protection rate. SSRR indicates the likelihood to fail to protect the on-screen information.

Similarly, URR is defined as the probability that the user successfully reads the information on the screen:

$$URR = N_{RU,Success}/N_{Total}$$

URR indicates whether or not the protection scheme maintains the comprehensibility of information. Ideally, SSRR (URR) should be close to 0 (1).

To evaluate the effectiveness of the HideText method, the protected texts are displayed in large size (0.3" character height on smartphone, 0.4" on tablet, 0.6" on laptop). In each test, one word is displayed on the screen with different levels of difficulty. The real user is asked to read out the displayed word. Similarly, the shoulder surfer is also asked to read out the displayed word.

Even though this evaluation uses a single word at a time, it does not imply that the HideText method can only be applied to the short single word. On the contrary, the worst case for the users is simulated where the shoulder surfer knows exactly what s/he is looking for and directly targets that specific text on the screen. Furthermore, this design gives the shoulder surfer the advantage of using the length to identify the corresponding word. If the shoulder surfer cannot recognize a simple large size word (e.g., boy), then it will be much harder for him to identify a specific, small-size (and possibly random) on-screen information mixed within a complete, protected message.

The test consists of 10 simple-level words (≤5 characters), 10 medium-level words (6-10 characters), and 10 difficult words (11-15 characters). The words in the lists are chosen to be easily recognizable by the participants. That is, there are no difficult words in the lists that a college-level participant may not know. Some examples of "difficult" words (11-15 characters) are: congratulation, environment, and neighborhood. For each test case, the participants were given 5 seconds to identify the word. In 5 seconds, the participants are able to guess or identify the word as many times as they can.

For the evaluation of smartphone, real users are asked to read the words from 10-12" and 20-24", respectively. The former simulates the conditions that people hold/use the phone in normal posture while the latter simulates the conditions that the user stretches his arm forward to read the content. The shoulder surfer is then asked to view the information from a distance greater than, or equal to $d_{SS,min}=d_{RU}+12$ inches, simulating the case of the shoulder surfer standing just behind the real user or sitting next to the real user. Similarly, real users were asked to view the devices from their normal viewing distances, and ask shoulder surfers to view the device 12" away from the real user for the evaluation of tablet/laptop. Finally, shoulder surfers were asked to use binoculars from anywhere greater than 200" (≈5 m) to identify the information shown on the screen. This simulates the attacker's observation of users across the street.

TABLE 2

| Effectiveness Of Test Protection | | | |
|---|---|---|---|
| Case ($d_{RU}$) | URR(%) | SSRR (%) | SSRR w/Bin. (%) |
| Phone (10-12") | 100 | 3.8 | 0 |
| Phone (20-24") | 96.4 | 2.2 | 0 |
| Tablet (≈18") | 100 | 0.0 | 0 |
| Laptop (≈24") | 100 | 3.6 | 0 |

The results of protection effectiveness are summarized in Table 2, showing that the HideText method is able to achieve high URR (≥96.4%) and low SSRR (≤3.8%). In scenarios with normal viewing distances, URRs are 100%. That is, the HideText method can protect text information without degrading the real users readability. To ensure that low SSRR values are not caused by texts being too small or participants' nearsightedness, shoulder surfers were also asked to identify the unprotected (plain) texts, which have the same size as the protected texts. The results show that all shoulder surfers are able to identify the plain texts (i.e., SSRR=100%), confirming HideScreen's prevention of shoulder surfers from recognizing the texts.

When they are free to move while keeping their distance to the device greater than 200", all attackers with binoculars are able to identify the unprotected texts; none of the attackers using binoculars is able to identify the protected texts, which have the same size as the unprotected texts. This protection against use of binoculars is expected according to the calculation of resolving power. The binoculars used in the experiments have 2.5 cm (0.98") object lens diameters, hence requiring the shoulder surfer to view the information within 193".

Furthermore, shoulders surfers with binoculars were asked to move inside the 200" range to see if they can identify the texts. The recognition rate in this case is only 1.8%. This is due to the mismatch of focus range of binoculars and the visible range of the protected text. That is, depending on the attacker's vision, it usually requires a greater than 193" distance to correctly focus on the device screen.

Similar to the testing scenarios of the HideText method, a protected image (0.5"×0.5") was displayed on the screen. In each test, real users and shoulder surfers were asked to identify the protected image. The protection effectiveness of the HideImage method was evaluated with the following settings. Participants first act as real users and are asked to view the figure shown on the screen from the standard viewing distance (10-12"). The participants are asked to identify the protected images. Next, participants act as shoulder surfers and try to identify the information displayed on the device screen from 12" away from the real user and are also asked to identify the images.

Participants are asked to identify the protected images in two ways: with or without reference images. For the 20 test cases without reference images, participants are asked to identify the presented images, such as a human figure or a dog. These tests evaluate whether participants are able to identify the coarse-grained information.

TABLE 3

Effectiveness Of Image Protection

|  | URR(%) | SSRR (%) | SSRR w/Bin. (%) |
|---|---|---|---|
| HideImage (w/o ref.) | 92.5 | 0.9 | 0 |
| HideImage (w/ref.) | 92.7 | 12.0 | 0 |
| SelImage | 100.0 | 2.0 | 0 |

For the 10 test cases with reference images, participants are asked to identify the original images from 5 given options. All the original (unprotected) images were recognizable by shoulder surfers before applying the HideImage method to eliminate the possibility that the protection is the result of image size being too small.

Similar to the previous evaluation setting, participants are asked to first act as real users and then shoulder surfers in the evaluation of the SelImage method. Five options are shown on the screen for the real user to pick which one is the real image (as the example shown in FIG. 13). For instance, if the real user chooses Fifthh the real object (the winter coat image) will be shown in the rightmost box. The locations of these object options are generated randomly and protected by the HideText method. After one of these options is chosen, the options disappear and the real object is then shown along with other four decoy images.

Table 3 summarizes the results of the effectiveness of the HideImage method and the SelImage method. Without reference images, the HideImage method is able to achieve 92.5% URR and 0.9% SSRR. Even though SSRR with reference images seems to be higher, 12% is still less than the probability of making a random guess (i.e., randomly picking one of the five image options as the real information). That is, given the protected image, an attacker is not able to read information more accurately than making a random guess. For the SelImage method, URR is 100% and SSRR is 2%, indicating HideScreen's protection of information from a shoulder surfer who tries to read on-screen information. Participants were also asked to use binoculars to read the on-screen information. Participants are then asked whether they have any clue in telling the real object. As expected, none of the participants was able to read the information.

The protections provided by HideScreen are compared to a privacy film. A standard privacy film with a 60° viewing range is used, which will dim the brightness of the screen when the viewing angle ($\phi$) exceeds 30°. The same settings as shown in FIG. 15B were adopted and the participants were asked to view the on-screen information from various distances and angles. Participants were asked to first stand in front of the device and gradually increase the viewing angle while maintaining the same viewing distance (d'=24"). The participants were shown unable to recognize the 0.3" texts at around 42°, indicating that the privacy film provides strong protection if the shoulder surfer is outside of a certain viewing angle. However, all 10 participants were able to recognize 0.3" unprotected texts when d'=36" and $\phi$<60°. Furthermore, all participants were also able to read regular size texts (14 sp) when d'=24" and $\phi$<60°. That is, using a privacy film provides only little to no protection if the shoulder surfer is standing behind the user while HideScreen provide >96% protection.

Next, consider a case when a malicious party (MP) uses the camera on his smartphone to take snapshots of the real user screen. FIG. 16 shows an example of how a protected image will appear in the photos taken from different distances (d') and angles ($\phi$). iPhone 6 and Pixel XL were used to take pictures of the real users screen from 28" away. In this setting, the theoretical visible distance is around 34". That is, the malicious party is only 83% of the maximum visible distance away from the device. Pictures were taken of the 30-word test cases and recruited 17 participants to view the pictures. The rate of correctly identifying at least one character in each photo is only 1.6% while the recognition rate of correctly identifying the entire word in each photo is only 0.8%.

Google Cloud Vision API was also used to analyze the photos of protected information. The results show that only 3.3% of the photos are recognized as texts (within top 5 recognition results/tags). Furthermore, none of the texts can be correctly identified by the optical character recognition (OCR) function in Google Doc even if the recognition results suggest that certain images contain texts. Similarly, participants were asked to identify the objects shown in photos of protected images. The rate of correctly identifying the information in each photo is 0%, and that of using vision API is also 0%. When choosing the texts and images for this evaluation, we make sure that all of their unprotected versions can be identified by the vision API from the photos. In summary, HideScreen is able to provide good information protection even when the MP uses his smartphone camera to take a picture of the user's screen.

Albeit not included in the original threat model, experiments were conducted with compact digital cameras and digital single-lens reflex (DSLR) cameras and took photos within 83% of their theoretical maximum visible distances. Using the same previous methodology, the results show that the recognition rate is 0% (4%) for texts (images) and that of vision API is 0% (0%).

The information loss/difference of HideImage-protected images was evaluated, especially the average information loss by computing the entropy differences between the original and protected images. Note that the information loss of the HideImage method is due to converting the image into greyscale and partitioning the images into color layers. Since there is no information loss when switching color layers with grids, the information loss is independent of the viewing range of the protected image. 100 color images (512×512 size, 24-bit color-coded) were used for this evaluation. The average information loss is shown to be 4.66 bits with maximum (minimum) of 5.87 (1.79) bits.

The pixel-wise value differences between the original and the protected images were further evaluated as an indicator of how different the protected images appear from the original image. Table 4 shows the mean, maximum, and minimum of root-mean-square of the pixel-wise differences with various $d_{max}$. The pixel-wise differences are shown to be around 90 within normal viewing distances ($d_{max}$=d+ $d_m$=24") and gradually increase when dmax increases.

TABLE 4

This table shows the root-mean-square of the pixel-wise differences with various maximum viewing distance $d_{max}$ based on the screen resolution of Pixel XL (534 ppi).

| | l(pixel) | | | | | | |
|---|---|---|---|---|---|---|---|
| | 1 | 2 | 3 | 4 | 5 | 6 | 7 |
| $d_{max}$ (inch) | 6.24 | 12.48 | 18.72 | 24.97 | 31.21 | 37.45 | 43.69 |
| Mean | 89.55 | 89.55 | 89.55 | 91.64 | 91.38 | 92.32 | 92.31 |
| Max. | 112.39 | 112.39 | 112.39 | 115.43 | 117.21 | 117.12 | 117.07 |
| Min. | 60.29 | 60.29 | 60.29 | 61.00 | 59.99 | 60.54 | 60.52 |

The time needed for users to comprehend (called comprehension time TC) the protected texts was evaluated; it is an indicator of how the HideText method changes user experience. Under an ideal condition, the HideText method should not increase the comprehension time much to provide good user experience. Settings are the same as above. The comprehension time of both protected and (unprotected) plain texts are recorded. Table 5 summarizes the results of average comprehension time.

TABLE 5

Comprehension time, $T_C$, for a single word

| | Simple Word $T_C$ (s) | Medium Word $T_C$ (s) | Difficult Word $T_C$ (s) |
|---|---|---|---|
| Plain | 1.29 | 1.22 | 1.4 |
| Protected | 1.88 | 2.07 | 2.75 |
| Overhead | 0.59 (46%) | 0.85 (70%) | 1.35 (96%) |

$T_C$ for protected texts increases as word length increases. The overhead per word is reasonable for our target application with up to 96% for difficult words. Since the HideText method is targeting privacy-sensitive applications, such as messaging, and the lengths of sensitive parts are usually short (a maximum of 160 characters for SMS), users will not have any problem in reading the entire protected message for less than 1 min. The use of a single word can also be considered as the worst case in terms of reading time. Since no other context can be used to help the user predict the word, he can only identify the word by visual perception. Therefore, it will take the user longer to identify the word individually than in a sentence.

Since energy consumption is an important concern to smartphone users, energy consumption of HideScreen is evaluated using a Nexus 5X (Android 6.0). Consider a typical scenario where a user uses instant messaging apps implemented with HideScreen's API. So, HideScreen need not capture the original screenshot and process it before generating the protected information. In such a case, the major energy consumption is incurred by the estimation of viewing distance, which depends highly on the design choice of how frequently HideScreen executes the estimation. Table 6 summarizes the energy consumption incurred by the estimation of viewing distance. It is calculated when the brightness of the screen is adjusted to 50% and all communication functions (i.e., WiFi, Bluetooth, and cellular) are turned off. Since users tend to maintain the same viewing distance, the estimation is done every 5 min and the corresponding energy overhead is 3.39%.

TABLE 6

HideScreen's energy overhead

| | Update Period (min) | | | | |
|---|---|---|---|---|---|
| | 1 | 3 | 5 | 10 | 30 |
| OH. of Dist. Est. (%) | 16.95 | 5.65 | 3.39 | 1.69 | 0.57 |
| OH. w/Processing (%) | 18.09 | 6.03 | 3.62 | 1.81 | 0.60 |

The other energy consumption comes from generating protected information. Since HideScreen can be implemented in a way that it stores the generated HideText characters and reuses them later, there will be no energy/latency overhead after the first use for text protection. Therefore, consider the instant message displaying images of size 256×256. The second row of Table 6 lists the total energy overhead when images are received at the same rate of updating viewing distance. According to Facebook's statistics, a Messenger user sends an average of 0.5 photos per day. Even if one considers the case where the user receives a photo every 5 min, the energy overhead is only 3.62%. Since this overhead is compared to the condition when no communication is on, the energy overhead will be even lower in the normal usage scenario with cellular connection on. The conclusion is that HideScreen's energy overhead is very low while supporting good user experience.

During this evaluation, the latency of generating protected images is measured. Different-size images are used generation is repeated 20 times. The average latency of generating a 128×128 image is 131 ms, and that of a 256×256 and a 512×512 image are 533 and 1684 ms, respectively. This latency is reasonable for apps like instant messages to provide good user experiences since the main delay for these applications is the time for delivering the information from one device to another, and all ten participants who provided feedback on the latency agree that it is short enough for good user experience.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Several ways for deploying HideScreen are contemplated by this disclosure. For example, HideScreen can be deployed as a library/API that provides a special "view" to display sensitive information. Developers can use this API to exercise fine-grained control over whether or not to protect certain information. This method has the most flexibility for developers to provide best user experience.

In another example, OS vendors can deploy HideScreen as a built-in function in their OS. Once HideScreen is enabled, every piece of information that a user requests will be processed and protected before it is displayed on the screen. This deployment can provide system level protection without the support from app developers, but requires OS modifications.

Without requiring any modification to the mobile device OS, HideScreen can also be deployed as a stand-alone app and acts as a software filter applied to onscreen information. After the user grants necessary permissions, this stand-alone app will first block all the information shown on the screen, capture the screenshot, process the contents, and finally generate the protected contents for display.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for displaying text on a display device, comprising:
    receiving, by a computer processor, an anticipated viewing distance between the display device and a user;
    calculating, by the computer processor, length of a cell in a grid as a function of the anticipated viewing distance, where the length of the cell is larger than size of a pixel of the display device;
    receiving, by the computer processor, text for display on the display device, where the text is comprised of one or more alphanumeric characters; and
    displaying, by the computer processor, the text on the display device, such that each alphanumeric character in the text is rendered using a grid, where the grid has a checkered pattern and the cells in the grid have the calculated length.

2. The method of claim 1 further comprises
    receiving a margin for error; and
    calculating length of a cell in the grid as a function of the anticipated viewing distance and the margin for error.

3. The method of claim 2 further comprises calculating length of a cell in the grid in accordance with $$l=(d+m)/(2\tan(0.5\theta))$$

wherein l is length of a cell in the grid, d is the anticipated viewing distance, m is margin for error and $\theta$ is minimum resolvable angle that describes resolving power of the optical system seeking protection from.

4. The method of claim 1 further comprises calculating length of a cell in the grid as a function of the anticipated viewing distance and size of a pixel in the display device.

5. The method of claim 1 further comprises
    determining a color for a background upon which the text is displayed, such that the rendered text will blend into the background; and
    displaying the text onto a background having the determined color, where the checkered pattern of the grid is formed by cells having a darker color and cells having a lighter color, and the determined color for the background differs from the lighter color.

6. The method of claim 5 further comprises rendering the alphanumeric characters in the text with a boundary separating each alphanumeric character from the background.

7. The method of claim 6 further comprises rendering the alphanumeric characters in the text with a series of three boundaries, such that an outer most boundary has the darker color of the cells in the grid, a middle boundary has the lighter color of the cells in the grid and an inner most boundary has the determined color for the background.

8. A method for displaying an image on a display device, comprising:
- receiving, by a computer processor, a grayscale image;
- partitioning, by the computer processor, the grayscale image into two or more color layers, where each of the two or more color layers corresponds to a range of intensity values for the pixels in the grayscale image and the ranges of intensity values for the two or more color layers are mutually exclusive from each other;
- for each color layer of the two or more color layers, replacing, by the computer processor, pixels with intensity values in the corresponding range with a grid, such that the grid has a checkered pattern by cells having a darker color and cells having a lighter color;
- adding, by the computer processor, each of the color layers of the two or more color layers together to form a composite protected image; and
- displaying the composite protected image on the display device.

9. The method of claim 8 further comprises, receiving a color image and converting the color image to the grayscale image before the step of partitioning the grayscale image.

10. The method of claim 8 further comprises, for each color layer of the two or more color layers, setting pixels with intensity values outside the corresponding range to black.

11. The method of claim 8 wherein pixels with intensity values in the corresponding range are replaced with a grid, such that contrast between the darker color and the lighter color of the grid varies amongst the two or more color layers.

12. The method of claim 8 further comprises determining a color for a background upon which the composite protected image is displayed, where the color of the background is set to an average of the darker color and the lighter color of the grid.

13. A method for displaying text on a display device, comprising:
- receiving, by a computer processor, an anticipated viewing distance between the display device and a user;
- calculating, by the computer processor, length of a cell in a grid as a function of the anticipated viewing distance, where the length of the cell is larger than size of a pixel of the display device;
- receiving, by the computer processor, text for display on the display device, where the text is comprised of one or more alphanumeric characters; and
- determining a color for a background upon which the text is displayed, such that the rendered text will blend into the background; and
- rendering, on a display device, the alphanumeric characters in the text onto a background having the determined color and with a boundary separating each alphanumeric character from the background, such that each alphanumeric character in the text is rendered using a grid, where the grid has a checkered pattern and the cells in the grid have the calculated length.

14. The method of claim 13 further comprises rendering the alphanumeric characters in the text with a boundary separating each alphanumeric character from the background.

15. The method of claim 14 further comprises rendering the alphanumeric characters in the text with a series of three boundaries, such that an outer most boundary has the darker color of the cells in the grid, a middle boundary has the lighter color of the cells in the grid and an inner most boundary has the determined color for the background.

\* \* \* \* \*